(12) United States Patent
Piccirelli

(10) Patent No.: US 11,028,774 B2
(45) Date of Patent: Jun. 8, 2021

(54) ACOUSTIC PANEL FOR A TURBOMACHINE AND METHOD FOR THE MANUFACTURING THEREOF

(71) Applicant: SAFRAN, Paris (FR)

(72) Inventor: Nicola Piccirelli, Chevreuse (FR)

(73) Assignee: SAFRAN, Paris (FR)

( * ) Notice: Subject to any disclaimer, the term of this patent is extended or adjusted under 35 U.S.C. 154(b) by 218 days.

(21) Appl. No.: 16/321,426

(22) PCT Filed: Jul. 28, 2017

(86) PCT No.: PCT/FR2017/052129
§ 371 (c)(1),
(2) Date: Jan. 28, 2019

(87) PCT Pub. No.: WO2018/020184
PCT Pub. Date: Feb. 1, 2018

(65) Prior Publication Data
US 2020/0378304 A1  Dec. 3, 2020

(30) Foreign Application Priority Data

Jul. 29, 2016 (FR) ........................... 1657417

(51) Int. Cl.
*F02C 7/045* (2006.01)
*F02K 1/82* (2006.01)
*B33Y 10/00* (2015.01)
*B33Y 80/00* (2015.01)
*B64D 33/02* (2006.01)

(52) U.S. Cl.
CPC .............. *F02C 7/045* (2013.01); *F02K 1/827* (2013.01); *B33Y 10/00* (2014.12); *B33Y 80/00* (2014.12);

(Continued)

(58) Field of Classification Search
CPC .... F02C 7/045; F02K 1/827; F05D 2260/963; B33Y 10/00; B33Y 80/00; B64D 2033/0206

(Continued)

(56) References Cited

U.S. PATENT DOCUMENTS 7,779,965 B2 *  8/2010  Marze ................. G10K 11/172
                                                            181/292
8,869,933 B1 * 10/2014  McKnight ........... G10K 11/172
                                                            181/286

(Continued)

FOREIGN PATENT DOCUMENTS

CN   201367965 Y   12/2009
CN   105458262 A    4/2016

(Continued)

OTHER PUBLICATIONS

Office Action dated Aug. 5, 2019, issued in corresponding Chinese Application No. 201780047330.8, 9 pages.

(Continued)

*Primary Examiner* — Forrest M Phillips
(74) *Attorney, Agent, or Firm* — Christensen O'Connor Johnson Kindness PLLC

(57) ABSTRACT

An acoustic panel for a turbomachine, in particular for an aircraft, includes two skins that are substantially parallel and between which extend cavities forming Helmholtz resonators, one of the skins being perforated by orifices opening into the cavities and forming necks of the Helmholtz resonators, vibrating masses being provided in at least some of the cavities and connected to cavity walls by an elastic junction housed in the cavity.

18 Claims, 1 Drawing Sheet

(52) U.S. Cl.
CPC ............... *B64D 2033/0206* (2013.01); *F05D 2260/963* (2013.01)

(58) Field of Classification Search
USPC .......................................................... 181/213
See application file for complete search history.

(56) References Cited

U.S. PATENT DOCUMENTS

| | | | |
|---|---|---|---|
| 2013/0142624 A1* | 6/2013 | Julliard | F02K 1/827 |
| | | | 415/119 |
| 2018/0010798 A1* | 1/2018 | Pettersson | F02K 1/827 |
| 2020/0049075 A1* | 2/2020 | Geertsema | B64D 29/00 |

FOREIGN PATENT DOCUMENTS

| | | | | |
|---|---|---|---|---|
| EP | 1533787 A1 | | 5/2005 | |
| FR | 3001324 A1 | | 7/2014 | |
| GB | 2452476 A | * | 3/2009 | ............... F02C 7/045 |
| GB | 2452476 A | | 3/2009 | |

OTHER PUBLICATIONS

English Translation of the Written Opinion of the International Searching Authority, issued in corresponding International Application No. PCT/FR2017/052129, filed Jul. 28, 2017, 4 pages.
International Search Report and Written Opinion dated Nov. 20, 2017, issued in corresponding International Application No. PCT/FR2017/052129, filed Jul. 28, 2017, 14 pages.

* cited by examiner

ACOUSTIC PANEL FOR A TURBOMACHINE AND METHOD FOR THE MANUFACTURING THEREOF

TECHNICAL FIELD

The present invention concerns an acoustic panel for a turbomachine as well as a manufacturing method for such a panel.

STATE OF THE ART

The state of the art comprises the documents U.S. Pat. No. 8,869,933, GB-A-2 452 476, EP-A1-1 533 787 and FR-A1-3 001 324.

A turbo machine, such as a turbojet engine, typically includes an air inlet including a fan whose outlet air flow is divided into an air flow that enters the engine and forms a hot flow or primary flow, and an air flow that flows around the engine and forms a cold flow or secondary flow.

The engine typically includes from upstream to downstream, in the direction of gas flow, at least one compressor, a combustion chamber, at least one turbine, and an ejection nozzle in which the combustion gases leaving the turbine and forming the primary flow are mixed with the secondary flow.

The turbo machine fan is surrounded by a fan housing that is integrated into the turbo machine nacelle. It is known to liner the inner surface of this housing with acoustic panels to limit the propagation of noise generated by the fan.

Typically, an acoustic panel includes two substantially parallel skins between which are located and extend cavities forming Helmholtz resonators and for example organized in a honeycomb. One of the skins is perforated with orifices opening into the cavities and forming resonator necks.

Cavity parameters, such as their shapes and dimensions, are determined so that the panel is able to absorb noise in a given frequency range. This frequency range has a relatively limited range, so a panel configured to absorb noises in a given frequency range is not effective at absorbing noises outside that range.

In addition to the sound insulation function, the sandwich structure of these panels ensures mechanical resistance and supports additional assembly elements.

In addition, the manufacturing of these panels includes several manufacturing steps and is therefore relatively complex: draping the lower skin, then pre-consolidating this skin, positioning the honeycomb structure (taking care not to deform the cells) previously shaped and coated with adhesive, draping the upper skin, crosslinking the polymer matrix of the whole, and perforating one of the skins.

This approach has the following technical limitations or disadvantages: the manufacturing method is not very flexible to ensure good acoustical insulation (perforating of the skin at each cell), and it is impossible to locally repair damaged skin without altering the acoustical insulation of the panel (acoustical insulation that cannot be separated from the structure). Depending on the shape of the panel, the acoustical insulation performances are altered because they depend on the ability to manufacture a honeycomb structure perforated at all points in the part.

SUMMARY OF THE INVENTION

This invention offers a simple, effective and economical solution to the problem of the prior art.

The invention proposes an acoustic panel for a turbomachine, in particular for an aircraft, comprising two skins that are substantially parallel and between which are located and extend cavities forming Helmholtz resonators, one of said skins being perforated by orifices opening into said cavities and forming necks of said resonators, vibrating masses being provided in at least some of said cavities and connected to cavity walls, characterized in that said vibrating masses are connected to said cavity walls by elastic means housed in said cavities.

The vibrating "masses" are advantageously configured to extend the range of noise absorption frequencies of the panel. Indeed, under the effect of the acoustical pressure p, a force F, equal to the product p.A, (A being the surface of a vibrating "mass") is applied to this vibrating "mass". The "masses" move in the cells of a value u equal to the product K.F (K being an elasticity constant of the elastic junction linking the mass to the support). This displacement has the effect of modifying the volume of the Helmholtz resonator cavity. The tuning frequency of a Helmholtz resonator is dependent on the volume of the cavity itself (all other things being constant), as shown in the relationship below.

Let $f_0$ be the tuning frequency of a Helmholtz cell $$f_0 = \frac{C}{2\pi}\sqrt{\frac{s}{Vl'}}$$

with C=the speed of sound, S the cross-section of the resonator neck, V the volume of the resonator, and l' the corrected or geometric length of the neck.

Thus, any variation in the volume of the cavity generates a change in the resonator tuning frequency. The masses contained in the resonators are then able to filter several acoustic frequencies dynamically.

The panel, according to the invention, may include one or more of the following characteristics, taken separately from each other or in combination with each other:
- each mass is connected by an elastic junction to a wall of a cavity,
- each mass is connected by an elastic junction to one of the skins,
- each mass is connected by an elastic junction to the skin opposite to the perforated one,
- the masses are mounted vibrating in directions substantially perpendicular to the skins,
- the masses are separated by gaps in the walls of the cavities,
- the elastic means or elastic junction include/includes a mesh or cellular structure, which allows to achieve the desired elasticity by adapting the meshes density and the performance of the material used,
- the elastic means are configured to give said masses their vibrating property.

This invention also concerns a turbomachine, such as an aircraft turboprop or turbojet, including at least one panel as described above.

The present invention also concerns a method of manufacturing of a panel as described above, including a step of producing said masses and said elastic means by additive manufacturing.

The additive manufacturing method consists in producing a part by successive deposition or consolidation of layers of the material. The acoustic elements are therefore produced in a single operation, and are therefore monolithic.

Advantageously, said skins and walls are produced by additive manufacturing.

Preferably, said skins and walls are produced in a first material and said masses and elastic means are produced in a second material, different from the first material.

DESCRIPTION OF THE DRAWINGS

The invention will be better understood and other details, characteristics and advantages of the invention will appear more clearly upon reading the following description, provided as an example and not limited thereto, and with reference to the appended drawings in which.

DETAILED DESCRIPTION

Figure 1:
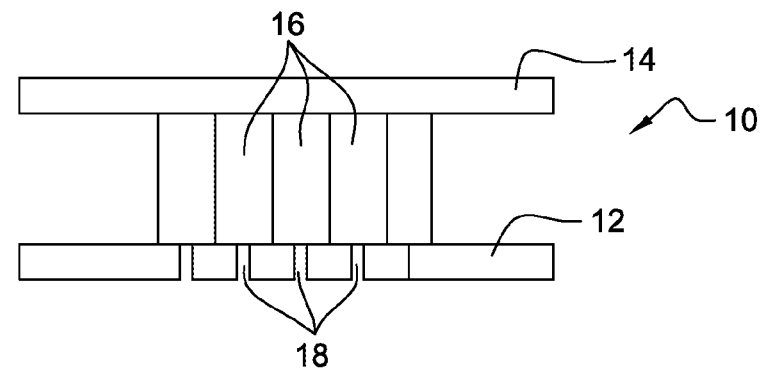
FIG. 1 is a very schematic cross-sectional view of an acoustic panel according to the prior art.

An acoustic panel 10, as shown in FIG. 1, includes two skins 12, 14, substantially parallel, between which are located a multitude of cavities 16.

The cavities 16 are evenly distributed and substantially identical. They extend side by side in a same plane substantially parallel to the skins 12, 14.

Each cavity 16 extends longitudinally between the skins. One of the skins, here the skin 12, is perforated and includes a multitude of orifices 18 that open into the cavities 16, which form Helmholtz resonators. Cavities 16 form the resonant cavities of the resonators and orifices 18 form necks of these resonators.

The tuning frequency of a Helmholtz resonator can be approximated by the following formula:

$$\text{Tuning frequency} = \frac{C}{2\pi}\sqrt{\frac{S}{Vl'}}$$

with C: speed of sound (m/s)
S: cross-section of the neck (m$^2$)
V: volume of the resonator (m$^3$)
l': corrected neck length (m) or l'=l+δ
with l: geometrical neck length (m)
δ: neck correction $$\begin{cases} \delta = 1.7r(1 - 0.7\sqrt{\sigma}) \\ \text{for juxtaposed resonators} \end{cases}$$

r: radius of an orifice (m)
σ: perforation rate

In this formula, the neck cross-section S amounts to the above-mentioned cross-section of an orifice 18, the resonator volume V amounts to the volume of a cavity 16, and the neck length l or l' amounts substantially to the thickness c of the perforated skin 12.

Figure 2:
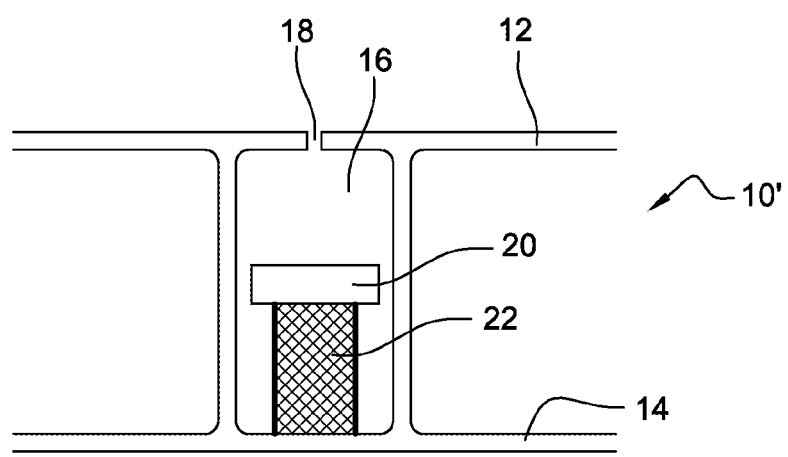
FIG. 2 is a very schematic cross-sectional view of an acoustic panel according to the invention.

FIG. 2 shows an embodiment of the invention. In at least some of the cavities 16 of the panel 10' according to the invention, vibrating masses 20 are provided, connected to walls of the cavities by elastic means 22.

Preferably, the elastic means are elastic junctions and preferably mesh or cellular structures 22. Each mass 20 is connected by such a structure to a wall of a cavity.

The masses 20 are able to move by vibration in directions substantially perpendicular to the skins 12, 14. The masses are separated by gaps of the side walls of the cavities, as well as the skins, to allow these movements.

Each mass has a weight M and is connected to a mesh or cellular structure of flexibility k and damping c. The mass can oscillate inside the cavity and has a gap j with the walls that allows air to pass through.

A judicious choice of the parameters M, k, c and j provides the cavity with damping characteristics to filter certain specific frequency ranges in the sound spectrum emitted by the turbomachine.

The manufacturing method of the prior art only allows the creation of cavities of relatively simple shapes, highly dependent on the honeycomb cells geometry.

However, when the cavities geometry is fixed, only a few frequencies are filtered. The acoustical insulation of the current solution is also not optimal since the cavities formed with honeycomb cells only filter certain targeted frequencies (volume of the fixed cavity), and do not have a damping function (low frequency filtration).

Figure 3:
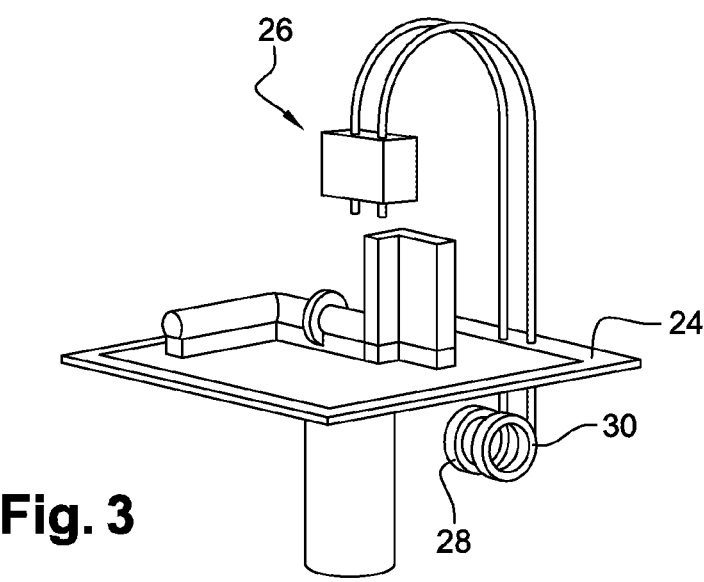
FIG. 3 is a very schematic view of a machine for producing a panel according to the invention, by additive manufacturing.

The invention addresses this problem and also proposes a manufacturing method for the panel 10', including a step of producing masses 20 and elastic junctions 22 by additive manufacturing, as illustrated in FIG. 3. Preferably, skins 12, 14 and the side walls of cavities 16 are produced by additive manufacturing. In this case, skins 12, 14 and walls are produced in a first material and masses 20 and elastic means 22 are produced in a second material, different from the first material.

There are two types of additive manufacturing of a part: either the part is produced by selective melting of powder beds, or the part is produced by successive deposits of molten material. However, this last technology is the most suitable for producing these cells with internal vibrating "masses".

The additive manufacturing method by molten wire deposition is shown in FIG. 3. The machine in FIG. 3 includes a support plate 24 on which the acoustic panel 10' is produced. The machine also includes an extrusion head 26 fed by a reel 28 of the first material and a reel 30 of the second material.

The extrusion head 26 is able to heat and melt the material of each reel 28, 30 in order to deposit the corresponding molten material on the support plate 24. The head is movable in a plane parallel to the plate and is thus able to deposit the molten material on the entire surface of the support plate, and also to superimpose several layers of material, to manufacture a part in three dimensions.

This means that the lower skin, for example 14, will be produced first using the reel 28. This reel is also used to manufacture the side walls of the cavities. The mesh or cellular structures 22 are then produced at the same time as the walls of the cavities 16, either with the same material or using a second material, via the reel 30, whose mechanical performances are more adapted to the desired elastic performances. As the walls are produced, the structures are produced, then the masses 20 are produced as shown in FIG. 2. The rest of the side walls of the cavities are formed and the skin 12, here upper, is produced with its orifices 18.

The first and second materials can be thermoplastics.

The invention claimed is:

1. An acoustic panel for a turbomachine, the acoustic panel comprising:

a first skin and a second skin, said first and second skins being parallel;

a plurality of cavities formed between said first and second skins, said plurality of cavities forming a plurality of Helmholtz resonators; and a plurality of vibrating masses, wherein at least one vibrating mass of the plurality of vibrating masses is provided within each cavity of said plurality of cavities, wherein said first skin is perforated by orifices, said orifices opening into said plurality of cavities and forming necks of said plurality of Helmholtz resonators, wherein said second skin is unperforated and defines a cavity wall in each cavity of said plurality of cavities, wherein in each cavity of said plurality of cavities, said at least one vibrating mass is connected to said cavity wall by an elastic junction housed in said cavity.

2. The acoustic panel of claim 1, wherein the elastic junction is one of a plurality of elastic junctions, and the cavity wall is one of a plurality of cavity walls.

3. The acoustic panel of claim 2, wherein each vibrating mass is connected by one of the elastic junctions to one of the first and second skins.

4. The acoustic panel of claim 3, wherein the second skin is opposite of the plurality of cavities from the first skin.

5. The acoustic panel according to claim 2, wherein each vibrating mass has a vibration direction that is substantially perpendicular to the first and second skins.

6. The acoustic panel according to claim 2, wherein a plurality of gaps in the plurality of cavity walls separate the plurality of vibrating masses.

7. The acoustic panel according to claim 1, wherein said elastic junction includes a mesh or a cellular structure.

8. The acoustic panel according to claim 1, wherein said elastic junction is configured to give said vibrating mass a vibrating property.

9. A turbomachine for an aircraft, including at least one acoustic panel according to claim 1.

10. The acoustic panel according to claim 1, wherein the plurality of cavities extend longitudinally between the first and second skins.

11. The acoustic panel according to claim 1, wherein each cavity of the plurality of cavities is formed by a first wall defined by the first skin, a second wall defined by the second skin, a first sidewall, and a second sidewall, wherein said first and second sidewalls extend perpendicularly to said first and second walls.

12. The acoustic panel according to claim 11, wherein within each cavity, the vibrating mass is separated by gaps from the first and second sidewalls of said cavity, said gaps being sized to allow vibration of the vibrating mass.

13. A method of manufacturing an acoustic panel for a turbomachine comprising a first skin and a second skin, said first and second skins being parallel, a plurality of cavities formed between said first and second skins, said plurality of cavities forming a plurality of Helmholtz resonators, and a plurality of vibrating masses, wherein at least one vibrating mass of the plurality of vibrating masses is provided within each cavity of said plurality of cavities, wherein said first skin is perforated by orifices, said orifices opening into said plurality of cavities and forming necks of said plurality of Helmholtz resonators, wherein said second skin is unperforated and defines a cavity wall in each cavity of said plurality of cavities, and wherein in each cavity of said plurality of cavities, said at least one vibrating mass is connected to said cavity wall by an elastic junction housed in said cavity, the method comprising:

producing said plurality of vibrating masses and said elastic junction by additive manufacturing.

14. The method of claim 13, further comprising additively manufacturing said first and second skins.

15. The method of claim 14, wherein said first and said second skins and said cavity wall comprise a first material and said vibrating mass and said elastic junction comprise a second material, different from the first material.

16. An acoustic panel for a turbomachine, comprising:
a plurality of parallel skins including a first skin perforated by a plurality of orifices, and a second skin that is unperforated;

a plurality of cavities extending between the plurality of parallel skins, each cavity forming a Helmholtz resonator, wherein the plurality of orifices of the first skin open into the plurality of cavities, each orifice forming a Helmholtz resonator neck; and a plurality of vibrating masses, each vibrating mass being located in one cavity of the plurality of cavities and each vibrating mass being connected by an elastic junction to a wall of said cavity in which the elastic junction is located, wherein in each cavity of the plurality of cavities, the vibrating mass is connected by the elastic junction to the second skin opposite to the first skin, and the vibrating mass and elastic junction are separated by gaps with respect to two sidewalls of the cavity.

17. The method of claim 13, wherein producing said plurality of vibrating masses and said elastic junction by additive manufacturing comprises successively depositing a molten material.

18. The method of claim 14, wherein the said first and second skins and said cavity wall comprise a first thermoplastic material and said vibrating mass and said elastic junction comprise a second thermoplastic material.

* * * * *